US012689239B2

(12) United States Patent 
Washiro et al.

(10) Patent No.: US 12,689,239 B2 
(45) Date of Patent: Jul. 21, 2026

(54) ANTENNA DEVICE, AND CONTACTLESS POWER TRANSFER SYSTEM

(71) Applicant: NTT, Inc., Tokyo (JP)

(72) Inventors: Takanori Washiro, Tokyo (JP); Kazuya Akiyama, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/694,707

(22) PCT Filed: Oct. 11, 2021

(86) PCT No.: PCT/JP2021/037582 
§ 371 (c)(1), 
(2) Date: Mar. 22, 2024

(87) PCT Pub. No.: WO2023/062685 
PCT Pub. Date: Apr. 20, 2023

(65) Prior Publication Data 
US 2024/0291324 A1 Aug. 29, 2024

(51) Int. Cl. 
H02J 50/40 (2016.01) 
H02J 50/05 (2016.01) 
H02J 50/12 (2016.01) 
H02J 50/20 (2016.01)

(52) U.S. Cl. 
CPC .............. H02J 50/40 (2016.02); H02J 50/05 (2016.02); H02J 50/12 (2016.02); H02J 50/20 (2016.02)

(58) Field of Classification Search 
CPC ........... H02J 50/12; H02J 50/40; H02J 50/402 
See application file for complete search history.

(56) References Cited

U.S. PATENT DOCUMENTS

| | | | |
|---|---|---|---|
| 7,504,905 B1 * | 3/2009 | Steinbrecher ........... | H02J 50/05 |
| | | | 333/260 |
| 10,291,036 B2 * | 5/2019 | Muratov ............... | H02J 50/402 |
| 2013/0026850 A1 | 1/2013 | Throngnumchai et al. | |
| 2015/0188364 A1 | 7/2015 | Kurashima et al. | |
| 2015/0318735 A1 * | 11/2015 | Jeong ...................... | H02J 50/12 |
| | | | 320/108 |
| 2016/0043575 A1 * | 2/2016 | Ichikawa .............. | H02J 50/402 |
| | | | 307/104 |
| 2017/0040690 A1 | 2/2017 | Peralta et al. | |
| 2024/0006114 A1 * | 1/2024 | Lim ........................ | H01F 27/38 |

FOREIGN PATENT DOCUMENTS

| | | | | |
|---|---|---|---|---|
| JP | 2001-238372 | | 8/2001 | |
| JP | 2006020207 A | * | 1/2006 | |
| JP | 2011-229360 | | 11/2011 | |
| JP | 2015-128347 | | 7/2015 | |
| JP | 2018-533238 | | 11/2018 | |
| WO | WO-2015002126 A1 | * | 1/2015 | .............. H02J 50/12 |

* cited by examiner

*Primary Examiner* — Ryan Johnson 
(74) *Attorney, Agent, or Firm* — IPUSA, PLLC

(57) ABSTRACT

An antenna device used in a contactless power transmission system includes a first resonant antenna having a first impedance and a second resonant antenna having a second impedance different from the first impedance.

7 Claims, 11 Drawing Sheets

LOW IMPEDANCE ANTENNA

HIGH IMPEDANCE ANTENNA

210

220

200: ANTENNA DEVICE

Fig. 1

IMPEDANCE

MOVEABLE
RANGE

INTER-ANTENNA DISTANCE

Fig. 11

ANTENNA DEVICE, AND CONTACTLESS POWER TRANSFER SYSTEM

TECHNICAL FIELD

The present invention relates to a non-contact power transmission system.

BACKGROUND ART

A resonance-type antenna that performs wireless power transmission by magnetic field coupling or electric field coupling can transmit power with higher transmission efficiency than an antenna that transmits and receives radio waves. Therefore, it is used for a battery-less non-contact IC card, wireless charging of a smartphone, or power supply to an electric vehicle.

However, in a resonance-type antenna using magnetic field coupling or electric field coupling, when the inter-antenna distance changes, the impedance of the antenna changes and the reflection increases, and thus, it is known that the transmission efficiency decreases depending on the inter-antenna distance.

As a technique for solving this problem, for example, Patent Literature 1 discloses a technique of determining whether or not an impedance matching condition is satisfied by a detection unit of a power transmission/reception state, and switching the impedance matching condition according to the result.

CITATION LIST

Patent Literature

Patent Literature 1: Japanese Unexamined Patent Application Publication No. 2001-238372

SUMMARY OF INVENTION

Technical Problem

However, in order to perform switching control by actively detecting the coupled state as in the prior art, power for performing the switching control is necessary in the first place, and power transmission cannot be efficiently performed. In addition, there is also a problem that the circuit becomes complicated and the number of components and the board size increase.

The present invention has been made in view of the above points, and an object of the present invention is to realize a non-contact power transmission system capable of transmitting power with high transmission efficiency over a wide range with little change in impedance even when a distance between antennas changes.

Solution to Problem

According to the disclosed technology, there is an antenna device used in a non-contact power transmission system, the device including a first resonant antenna having a first impedance, and a second resonant antenna having a second impedance different from the first impedance.

Advantageous Effects of Invention

According to the disclosed technology, it is possible to realize a non-contact power transmission system capable of performing power transmission with high transmission efficiency over a wide range with a small change in impedance even when the distance between antennas changes.

BRIEF DESCRIPTION OF DRAWINGS

FIG. 1 is a diagram illustrating a basic configuration example of a non-contact power transmission system.

FIG. 11 is a diagram illustrating a configuration example of an antenna device according to the embodiment of the present invention.

DESCRIPTION OF EMBODIMENTS

Figure 2:
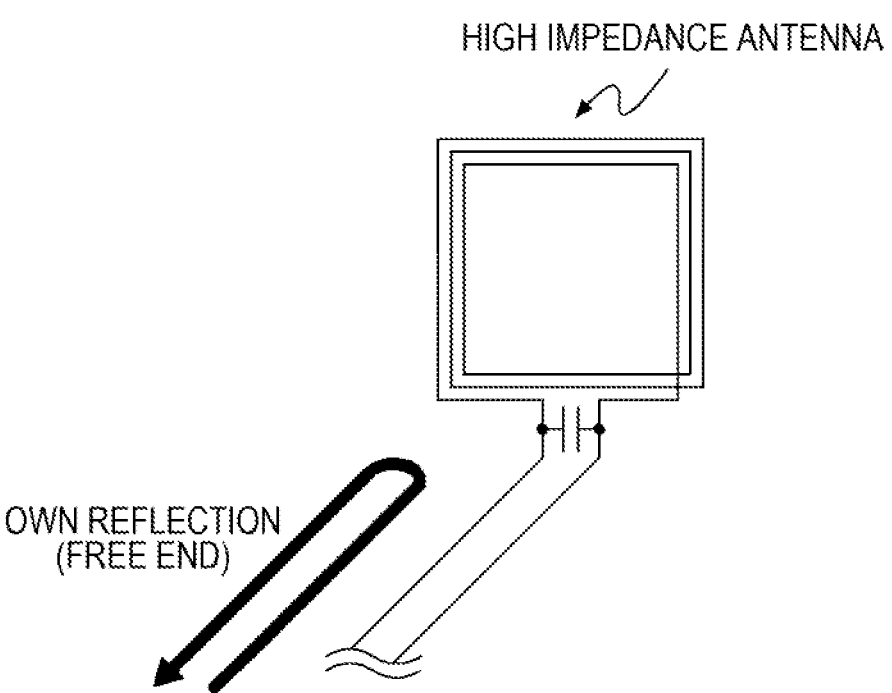
FIG. 2 is a diagram illustrating own reflection in a magnetic field antenna using an LC parallel resonance circuit.

An embodiment (the present embodiment) of the present invention will be described below with reference to the drawings. The embodiment described below is merely an example, and embodiments to which the present invention is applied are not limited to the embodiment described below.

Configuration Example and Problem of Non-Contact Power Transmission System

Figure 1:
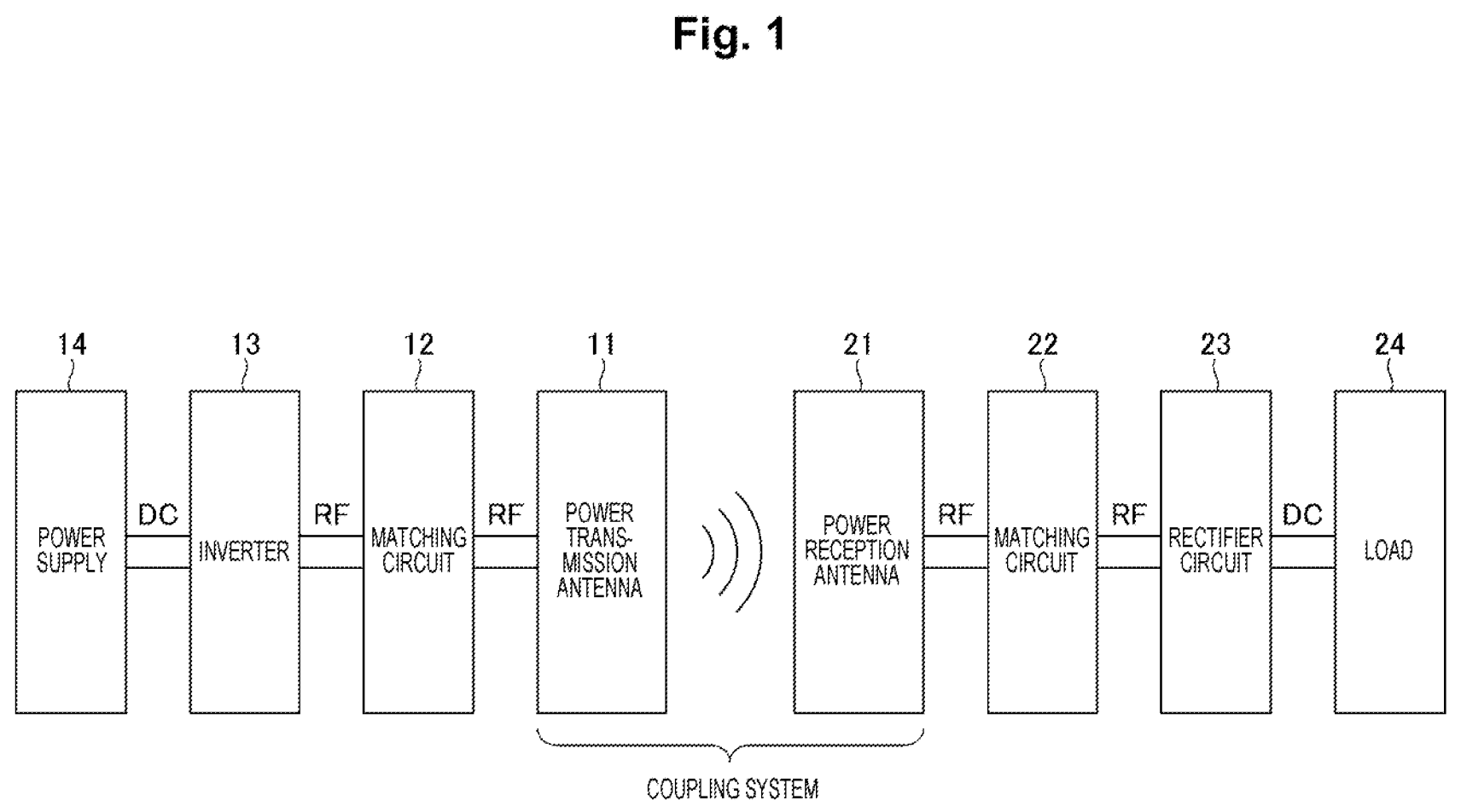

FIG. 1 illustrates a basic configuration example of a non-contact power transmission system. As illustrated in FIG. 1, the non-contact power transmission system includes a power transmission antenna 11, a matching circuit 12, an inverter 13, and a power supply 14 on a power transmission side. On a power reception side, a power reception antenna 21, a matching circuit 22, a rectifier circuit 23, and a load 24 are provided.

As illustrated in FIG. 1, the non-contact power transmission system transmits power in a non-contact manner between the facing power transmission antenna 11 and the power reception antenna 21 configuring a coupling system. As the power transmission antenna 11 and the power reception antenna 21, a magnetic field antenna including a coil or an electric field antenna including an electrode is used. Both the power transmission antenna 11 and the power reception antenna 21 are resonance-type antennas. The resonance-type antenna may be referred to as a "resonant antenna".

In a non-contact power transmission system, unlike a far-field antenna that continues to emit a constant radio wave regardless of whether or not a counterpart is nearby, a near-field magnetic field coupling antenna or an electric field coupling antenna using resonance between antennas does not emit power into the air when the counterpart is not nearby, and the power that has lost a way is reflected by the antenna and returned to the power transmission circuit side.

FIG. 2 is a diagram illustrating the above phenomenon in a magnetic field antenna using an LC parallel resonance circuit. As illustrated in FIG. 2, in the magnetic field antenna using the LC parallel resonant circuit, since power is reflected without phase inversion, the antenna can be regarded as a free end, and the antenna has a high impedance.

Figure 3:
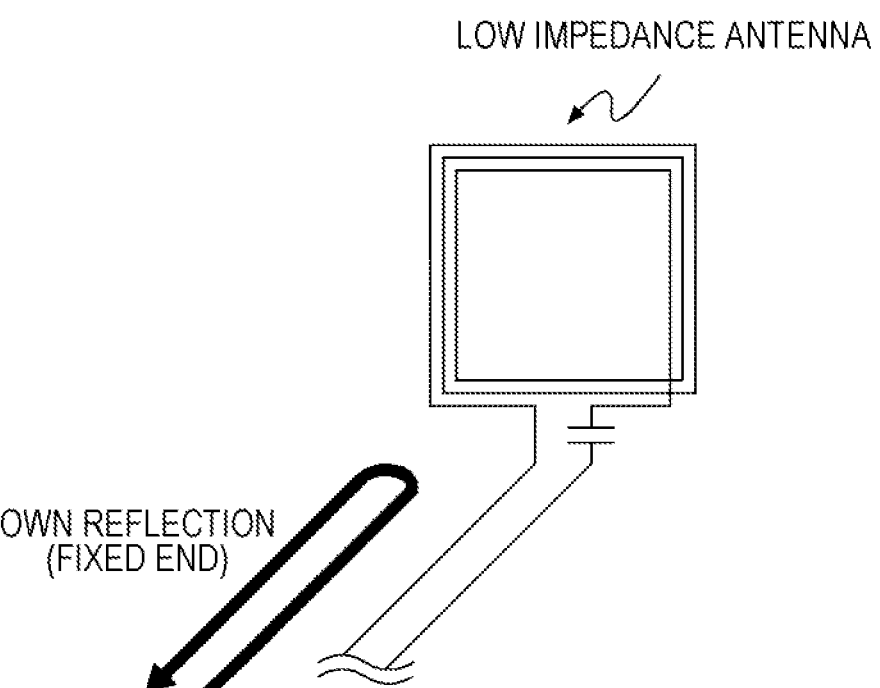
FIG. 3 is a diagram illustrating own reflection in a magnetic field antenna using an LC series resonance circuit.

On the other hand, as illustrated in FIG. 3, in the magnetic field antenna using the LC series resonant circuit, since the phase is inverted and the power is reflected, the antenna can be regarded as a fixed end, and the antenna has low impedance.

In a case where there is an antenna facing near the resonant antenna, for example, a magnetic field generated by the power transmission antenna 11 of magnetic field coupling excites resonance of the power reception antenna 21, and a new magnetic field is generated near the power transmission antenna 11 by the resonated power reception antenna 21.

Figure 4:
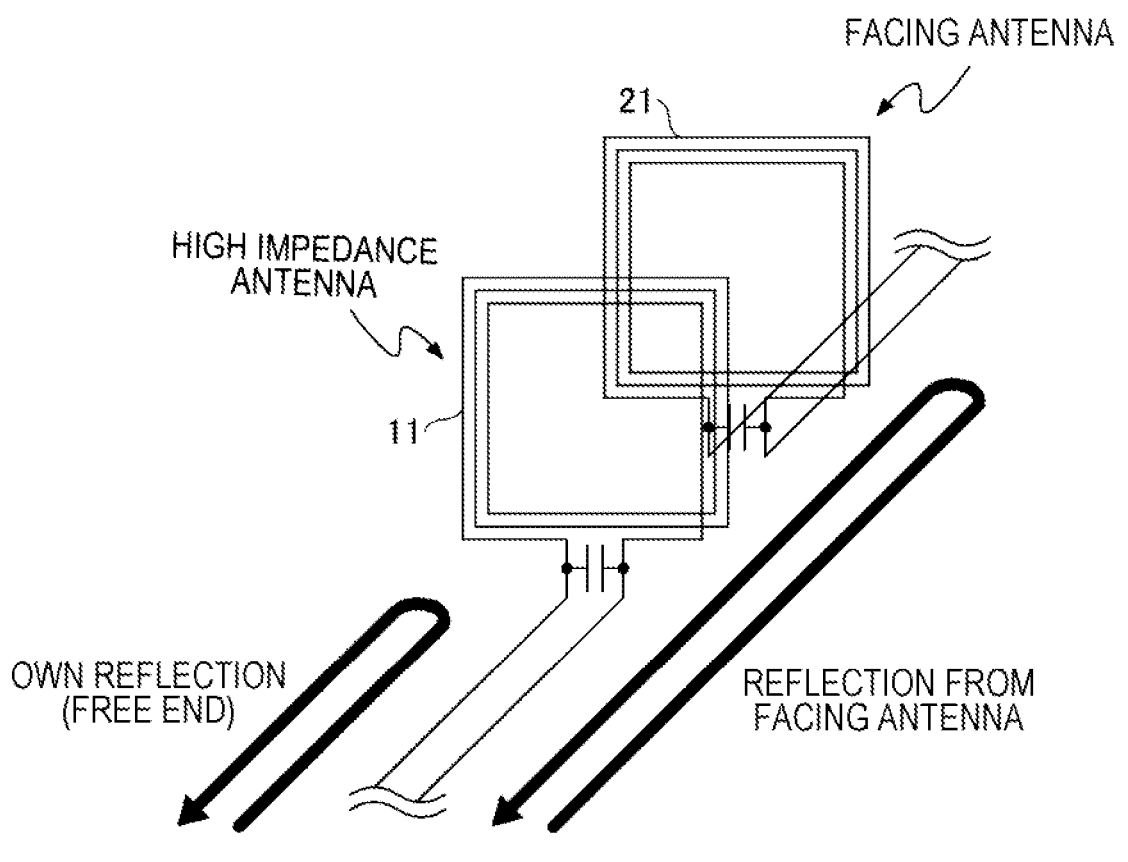
FIG. 4 is a diagram illustrating a power transmission antenna 11 and a power reception antenna 21 using the LC parallel resonance circuit.
Figure 5:
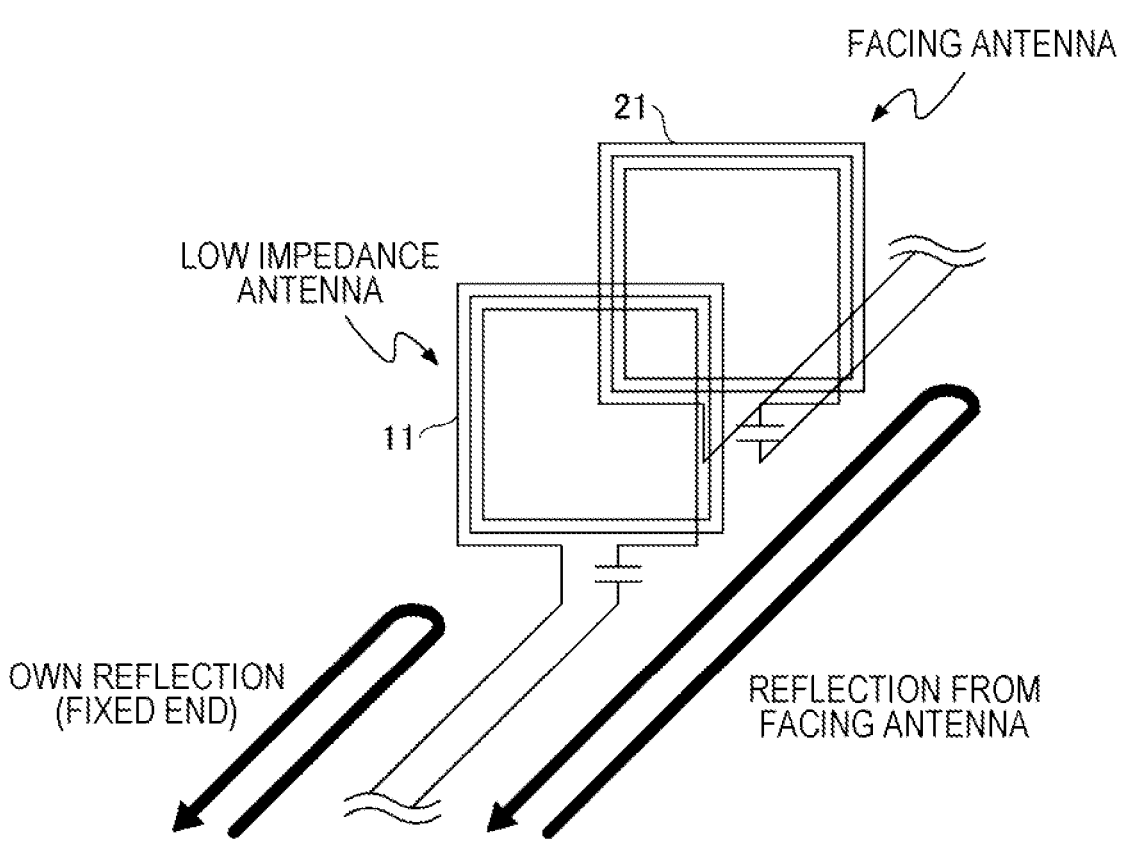
FIG. 5 is a diagram illustrating the power transmission antenna 11 and the power reception antenna 21 using the LC series resonance circuit.

Therefore, as illustrated in FIG. 4 (in a case of using the LC parallel resonance circuit) and in FIG. 5 (in a case of using the LC series resonance circuit), the own reflection of the power transmission antenna 11 and reflection from the facing antenna 21 are simultaneously observed. The sign of reflection from the facing antenna is opposite to that of its own reflection, and the reflection from the facing antenna increases as the distance between the antennas decreases.

Figure 6:
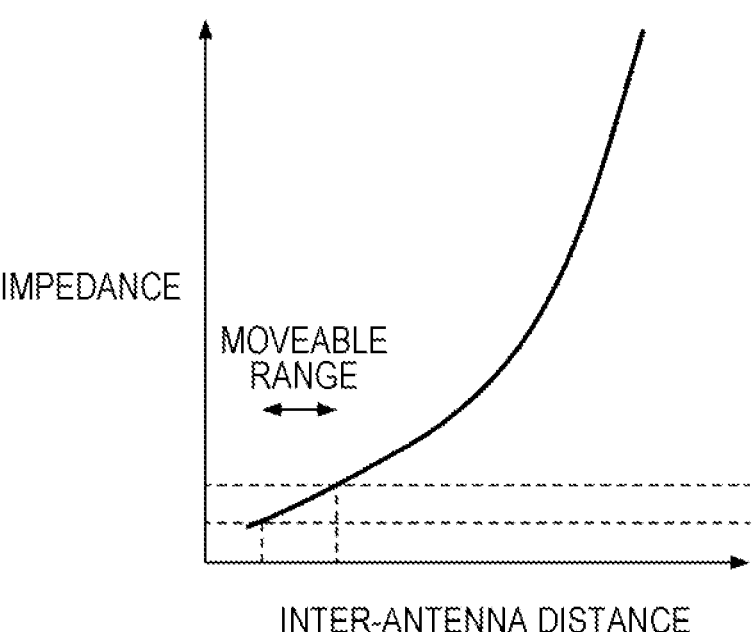
FIG. 6 is a diagram illustrating a relationship between an inter-antenna distance and impedance in a case where a high impedance antenna is used alone.
Figure 7:
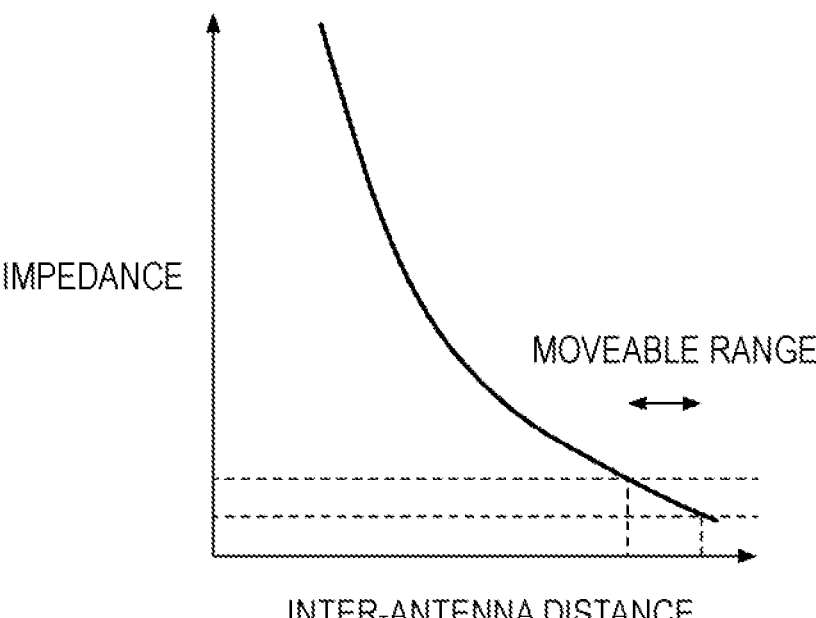
FIG. 7 is a diagram illustrating a relationship between an inter-antenna distance and impedance in a case where a low impedance antenna is used alone.

As a result, the impedance of the antenna changes depending on the distance between the antennas as illustrated in FIGS. 6 and 7. FIG. 6 illustrates a case of a high impedance antenna alone, and FIG. 7 illustrates a case of a low impedance antenna alone.

That is, in the case of the single high impedance antenna as illustrated in FIG. 6, as the inter antenna distance decreases, the reflection from the antenna facing its own reflection at some distance, the reflection from the facing antenna cancels out at a certain distance, and impedance matching is achieved. However, as the inter-antenna distance further decreases, the sign of the reflected wave is inverted, the impedance further decreases, and the reflection increases. In addition, in the case of a low impedance antenna alone, the impedance increases as the inter-antenna distance decreases as illustrated in FIG. 7.

In any case, since the power transmission can be efficiently performed only when the impedance of the antenna and the impedance of the power transmission circuit match and the reflection is suppressed, the operable distance between the antennas is limited to a narrow range as illustrated in FIGS. 6 and 7.

Figure 8:
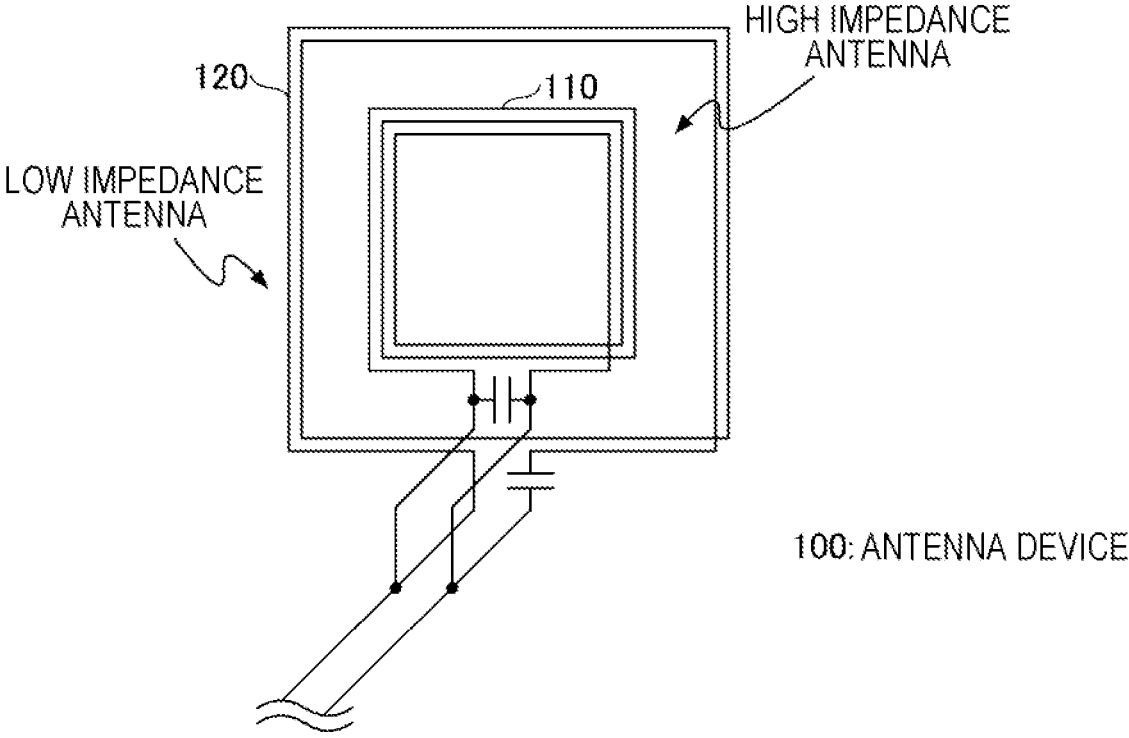
FIG. 8 is a diagram illustrating a configuration example of an antenna device according to the embodiment of the present invention.

Configuration Examples of Antenna Device and Non-Contact Power Transmission System in Present Embodiment FIG. 8 is a diagram illustrating a configuration example of the antenna device 100 according to the present embodiment. As illustrated in FIG. 8, the antenna device 100 has a configuration in which a high impedance antenna 110 and a low impedance antenna 120 are connected in parallel. In the example illustrated in FIG. 8, the high impedance antenna 110 is an LC parallel resonant magnetic field antenna, and the low impedance antenna 120 is an LC series resonant magnetic field antenna.

As illustrated in FIG. 6, the impedance of the high impedance antenna 110 decreases as the distance between the antennas decreases, and conversely, as illustrated in FIG. 7, the impedance of the low impedance antenna 120 increases as the distance between the antennas decreases.

Figure 9:
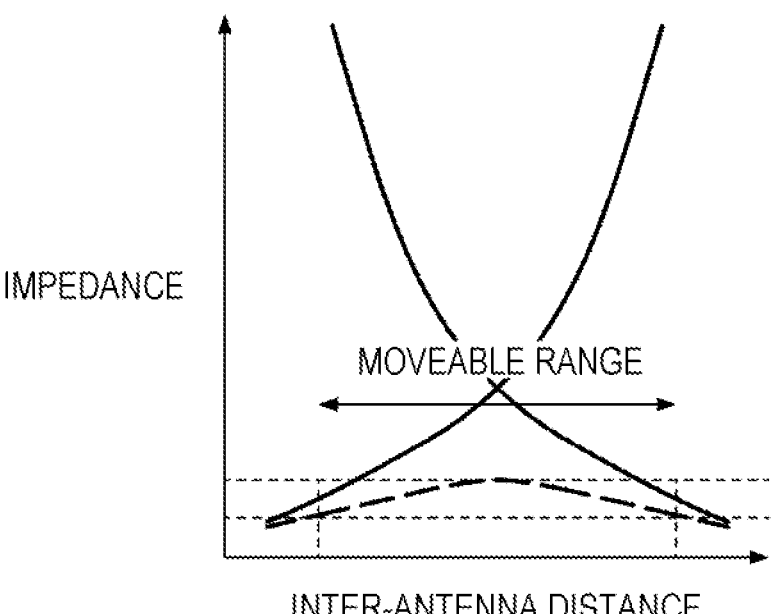
FIG. 9 is a diagram illustrating a relationship between an inter-antenna distance and impedance in a case of using an antenna in which a high impedance antenna and a low impedance antenna are connected in parallel.

FIG. 9 is a diagram illustrating a relationship between an impedance combined by connecting the antenna 110 and the antenna 120 in parallel and an inter-antenna distance. As indicated by a broken line in FIG. 9, the change in impedance with respect to the inter-antenna distance is small, and the operation can be efficiently performed over a wide inter-antenna distance.

In addition, as illustrated in FIG. 8, by disposing the respective antennas such that the centers of the two resonant antennas 110 and 120 are at the same position, the distance between the antennas becomes the same with the antennas facing each other in the two antennas 110 and 120, and thus there is an advantage that it is easy to design.

Note that "the same position" may mean that centers of two resonant antennas 110 and 120 are at the same position as viewed from the antenna device on the side facing the antenna device including the two resonant antennas 110 and 120 in the non-contact power transmission system. In addition, "the same position" may mean that the centers of the two antennas are not strictly the same, and for example, if a deviation is equal to or less than a certain threshold value, the two antennas may be regarded as being at "the same position".

As the antenna for the non-contact power transmission system in the present embodiment, an electric field antenna using electric field coupling between electrodes may be used in addition to a magnetic field antenna using magnetic field coupling between coils as illustrated in FIG. 8.

Figure 10:
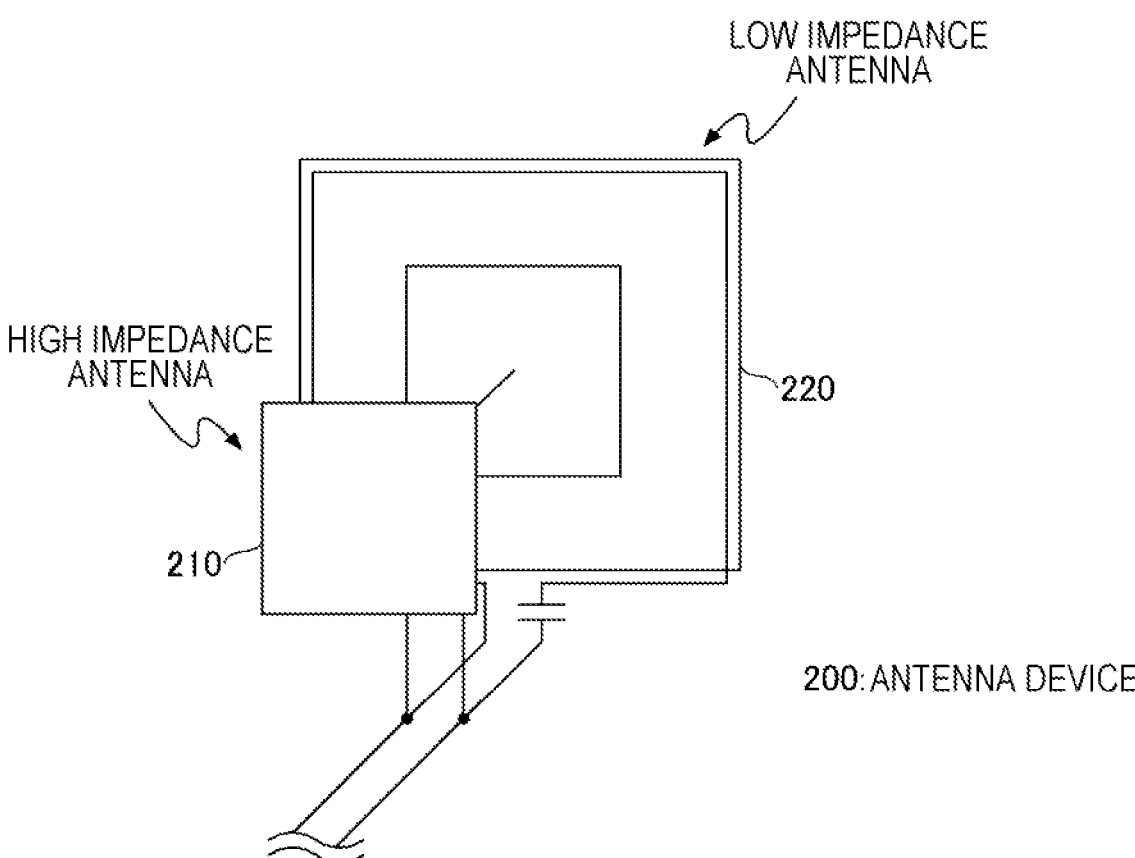
FIG. 10 is a diagram illustrating a configuration example of an antenna device including a magnetic field antenna of LC series resonance and an electric field antenna using electric field coupling between electrodes.

Furthermore, the configuration of an antenna device 200 illustrated in FIG. 10 may be used. The antenna device 200 illustrated in FIG. 10 includes a magnetic field antenna 220 of LC series resonance as a low impedance antenna, and an electric field antenna 210 using electric field coupling between electrodes as a high impedance antenna.

Figure 11:
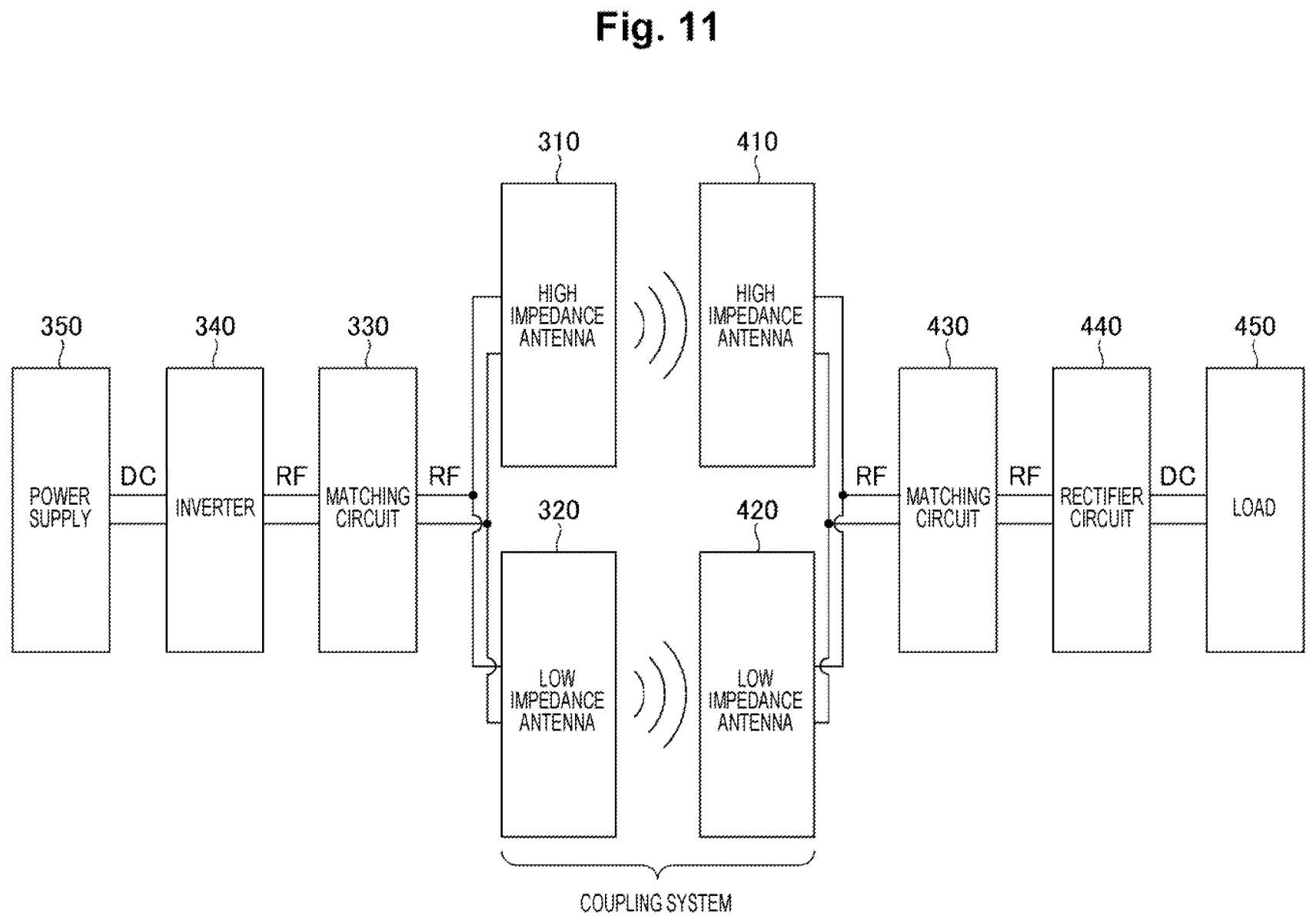

FIG. 11 illustrates a configuration example of a non-contact power transmission system according to the present embodiment. The non-contact power transmission system includes, on the power transmission side, a high impedance antenna 310, a low impedance antenna 320, a matching circuit 330, an inverter 340, and a power supply 350, and on the power reception side, a high impedance antenna 410, a low impedance antenna 420, a matching circuit 430, a rectifier circuit 440, and a load 450. The high impedance antenna 310 and the low impedance antenna 320 are connected in parallel, and the high impedance antenna 410 and the low impedance antenna 420 are also connected in parallel.

Between the high impedance antenna 310 and the low impedance antenna 320, the high impedance antenna 310 has an impedance higher than the impedance of the power transmission and reception circuit (for example, the matching circuit 330) to be connected, and the low impedance antenna 320 has an impedance lower than the impedance of the power transmission and reception circuit.

In addition, between the high impedance antenna 410 and the low impedance antenna 420, the high impedance antenna 410 has an impedance higher than the impedance of the power transmission and reception circuit (for example, the matching circuit 430) to be connected, and the low impedance antenna 420 has an impedance lower than the impedance of the power transmission and reception circuit.

As in the configuration example of FIG. 11, by connecting two resonant antennas having different impedances in parallel on each of the power transmission side and the power reception side, it is possible to offset the change in the impedance of each antenna with respect to the change in the distance between the antennas, and to reduce the change in the impedance with respect to the change in the distance between the antennas.

Note that the type, shape, arrangement, and the like of the antennas are not limited to those exemplified above. In addition, the technology according to the present invention can be applied not only to a non-contact power transmission system intended only for power transmission but also to a non-contact IC card system that simultaneously performs power transmission and communication. A non-contact IC card system that simultaneously performs power transmission and communication is an example of a "non-contact power transmission system".

Effects of Embodiments

According to the technology of the present embodiment described above, in the non-contact power transmission system, the degree of change in impedance of the antenna with respect to the distance between the antennas of the facing antennas is relaxed, the state of impedance matching is maintained even when the distance between the antennas changes, reflection is suppressed to be low, and power can be efficiently transmitted over a wide distance range.

In addition, since it is not necessary to actively detect or control the coupling state, it is possible to reduce power consumption, reduce the number of components of the circuit, and downsize the substrate.

Supplementary Notes

In the present specification, at least the following antenna device and non-contact power transmission system are disclosed.

Supplementary Note 1

An antenna device used in a non-contact power transmission system, the device including a first resonant antenna having a first impedance, and a second resonant antenna having a second impedance different from the first impedance.

Supplementary Note 2

The antenna device according to Supplementary Note 1, in which the first resonant antenna and the second resonant antenna are connected in parallel.

Supplementary Note 3

The antenna device according to Supplementary Note 1 or 2, in which the first resonant antenna and the second resonant antenna are disposed such that a center of the first resonant antenna and a center of the second resonant antenna are at the same position.

Supplementary Note 4

The antenna device according to any one of Supplementary Notes 1 to 3, in which the antenna device is connected to a power transmission and reception circuit in the non-contact power transmission system, the first impedance is higher than an impedance of the power transmission and reception circuit, and the second impedance is lower than the impedance of the power transmission and reception circuit.

Supplementary Note 5

A non-contact power transmission system in which a first antenna device that is the antenna device according to any one of Supplementary Notes 1 to 4 and a second antenna device that is the antenna device according to any one of Supplementary Notes 1 to 4 are arranged to face each other.

Although the embodiments are described above, the present invention is not limited to the specific embodiments, and various modifications and changes can be made within the scope of the gist of the present invention described in the claims.

REFERENCE SIGNS LIST

11 Power transmission antenna
12 Matching circuit
13 Inverter
14 Power supply
21 Power reception antenna
22 Matching circuit
23 Rectifier circuit
24 Load
100 Antenna device
110 High impedance antenna
120 Low impedance antenna
200 Antenna device
220 Magnetic field antenna
210 Electric field antenna
310 High impedance antenna
320 Low impedance antenna
330 Matching circuit
340 Inverter
350 Power supply
410 High impedance antenna
420 Low impedance antenna
430 Matching circuit
440 Rectifier circuit
450 Load

The invention claimed is:

1. An antenna device configured to be used in a contactless power transmission system, the antenna device comprising:

a first antenna having a first impedance; and a second resonant antenna having a second impedance different from the first impedance, wherein the antenna device is connected to a power transmission and reception circuit in the contactless power transmission system, wherein the first impedance is higher than an impedance of the power transmission and reception circuit, and the second impedance is lower than the impedance of the power transmission and reception circuit, wherein the first antenna and the second resonant antenna are connected in parallel, the first antenna is an electric field antenna using electric field coupling, and the second resonant antenna is a magnetic field antenna of an LC series resonance circuit using magnetic field coupling, the first impedance decreases as the distance to a facing antenna decreases, and the second impedance increases as the distance to the facing antenna decreases.

2. The antenna device according to claim 1, wherein the first antenna and the second resonant antenna are disposed such that a center of the first antenna and a center of the second resonant antenna are at a same position.

3. A contactless power transmission system comprising: two antenna devices each of which is the antenna device of claim 1.

4. The antenna device according to claim 1, wherein the parallel connection of the first antenna and the second resonant antenna forms a combined impedance, and the parallel connection is configured such that the decrease in the first impedance and the increase in the second impedance mutually offset each other when the distance to the facing antenna decreases, thereby reducing a change in the combined impedance.

5. The antenna device according to claim 4, wherein the power transmission and reception circuit comprises a matching circuit, and wherein the reduction in the change in the combined impedance maintains an impedance matching state with the matching circuit when the distance to the facing antenna changes.

6. The contactless power transmission system according to claim 3, wherein the power transmission and reception circuit of the first antenna device comprises a first matching circuit and an inverter, and the power transmission and reception circuit of the second antenna device comprises a second matching circuit and a rectifier circuit.

7. The antenna device according to claim 4, wherein the antenna device is configured to maintain an impedance matching state with the power transmission and reception circuit without actively detecting or controlling a coupling state of the antenna device.

\* \* \* \* \*